UNITED STATES PATENT OFFICE 1,973,731

ACID AND WATERPROOF CEMENT

Foster Dee Snell, Brooklyn, N. Y.

No Drawing. Application October 6, 1930,
Serial No. 486,864

7 Claims. (Cl. 106—30)

This invention relates to the production of an acid-proof cement and has for its object the production of an acid-proof cement which will set by chemical, as distinguished from mechanical, action, such as evaporation, whereby the cement set in a moist or humid atmosphere will have a substantially uniform bond throughout.

Another object of the invention is to provide an improvement in acid-proof cements of the type which consists largely of crystalline silica, such as ground quartz, ground stone-ware, or the like, and silicate of soda and in which the cement is caused to set by the reaction of an alkali on the silicate of soda to produce an alkali silicate.

Another object of the invention is to provide an acid-proof cement which will be workable for a sufficient time after mixing to permit of proper application by trowelling or the like and which will set more slowly than the acid precipitated cements of this type whereby the cement may accommodate itself to stresses and strains but will set hard enough for use in two or three hours time.

Various other objects and advantages will appear as this description proceeds.

In producing my cement, I first mix together silicious material, such as ground stone-ware, ground quartz or the like, using preferably for each one hundred pounds of crystalline silicious material fifty to seventy pounds of sodium silicate and from five-tenths to two per cent (0.5 to 2%) on the weight of the dry materials of an alkali reaction substance capable of reacting with the sodium silicate to produce an insoluble alkali silicate, such as aluminum or calcium silicate. The amount of alkali material used in general controls the rate and hardness of the set. A large amount of alkali material bordering in the neighborhood of two to two and one-half percent (2 to 2½%) will cause an almost immediate set, whereas smaller amounts in the neighborhood of five-tenths per cent (0.5%) of such substances as aluminum hydrate will produce a product which is workable for ten (10) minutes or more after mixing and will set hard in two or three days time. The moderate rate of set obtained by the use of alkali materials is preferable in many instances to the quick set obtained by the use of acid materials as the slower setting permits the cement to yield to stresses and strains for some time after it has been put in place and at the same time gives it a firm consistency within a comparatively short time after its application. In lieu of aluminum hydrate, which reacts with sodium silicate to produce a hard insoluble aluminum silicate in the cement mix, other alkali materials, such as hydrated lime may be used.

The term aluminum hydrate is used herein to define commercial aluminum hydrate, sometimes called commercial light aluminum hydrate, which is substantially a complete hydrate of the formula $Al_2O_3, 3H_2O$ or $Al(OH)_3$ and not bauxite.

While the use of an alkaline substance, such as aluminum hydrate or hydrated lime alone accelerates the rate of set and increases the ultimate hardness of acid-proof cements of the type herein described, I have found that the use of sodium fluosilicate in connection with aluminum hydrate produces an acid-proof cement which is more desirable for some uses than the use of aluminum hydrate alone. The mixture of four (4) parts of sodium fluosilicate to five (5) parts of aluminum hydrate produces an alkaline reaction and may be used in proportions of five-tenths to two per cent (0.5 to 2%) or more of the silicious material and sodium silicate mixture. A composition containing two per cent (2%) of the aluminum hydrate sodium fluosilicate mixture is workable for ten (10) minutes and in a saturated humidity sets to a greater hardness than the cement in which aluminum hydrate alone is used. A slower setting cement can be produced, if desired, by the use of ground silicious material, sodium silicate and lower percentages of the aluminum hydrate sodium fluosilicate mixture or substantially five-tenths per cent (0.5%) aluminum hydrate alone.

It will be understood that the percentages given are designed to give the best results for the given conditions and for a given type of cement. It will be obvious, however, that the percentages may be varied and that equivalent materials to those specifically mentioned may be substituted without departing from the spirit of my invention or the scope of the appended claims.

I claim:

1. The improvement in the manufacture of acid and water-proof cements by the mixing of silicious material and sodium silicate which comprises increasing the hardness and density of the cement by adding to the silicious material aluminum hydrate to form an aluminum silicate in said cement.

2. The improvement in the manufacture of acid and water-proof cements formed principally of silicious material and sodium silicate which comprises adding to the silicious and sodium silicate mixture a neutral or alkaline mixture of aluminum hydrate and sodium fluosilicate.

3. An acid and water-proof cement comprising a mixture of ground silicious material, sodium silicate and from .5 to 2% of aluminum hydrate.

4. An acid and water-proof cement comprising one hundred (100) parts silicious material, fifty (50) to seventy (70) parts sodium silicate and .5 to 2% of a mixture of four (4) parts sodium fluosilicate and five (5) parts aluminum hydrate.

5. An acid and water-proof cement consisting of silicious material and sodium silicate together with an alkaline mixture of fluosilicate and aluminum hydrate amounting to 0.5 to 2% of the whole.

6. An acid and water-proof cement comprising approximately 100 parts silicious material, 50 to 70 parts sodium silicate and .5 to 2% of a mixture of approximately four (4) parts sodium fluo-silicate and five (5) parts of metal oxide of the group consisting of aluminum hydrate and calcium hydrate.

7. The improvement in the manufacture of acid and water-proof cements formed principally of silicious material and sodium silicate which comprises adding to the silicious and sodium silicate mixture .5 to 2% of aluminum hydrate.

FOSTER DEE SNELL.